United States Patent [19]
Patterson

[11] Patent Number: 5,927,606
[45] Date of Patent: Jul. 27, 1999

[54] AGRICULTURAL BOOM WITH A RETRACTABLE TIP PORTION

[75] Inventor: Roger L. Patterson, Selkirk, Canada

[73] Assignee: MacDon Industries Ltd., Winnipeg, Canada

[21] Appl. No.: 08/904,148

[22] Filed: Jul. 31, 1997

[51] Int. Cl.[6] .................................................... B05B 1/20
[52] U.S. Cl. ............................................................. 239/167
[58] Field of Search ................................... 239/159, 163, 239/164, 166, 167, 168

[56] References Cited

U.S. PATENT DOCUMENTS

| | | | |
|---|---|---|---|
| 4,044,952 | 8/1977 | Williams et al. | 239/168 |
| 4,634,051 | 1/1987 | Dudley | 239/168 |

FOREIGN PATENT DOCUMENTS

| | | | |
|---|---|---|---|
| 2038153 | 7/1980 | United Kingdom | 239/168 |

OTHER PUBLICATIONS

Brochure by Tyler—"Patriot Applicator" (4 pages).
Brochure by Tyler—Patriot Applicators (6 pages).
Brochure by Flexicoil—"6565 Field Sprayer" (6 pages).
Brochure by Knight—"Model KM1000" (4 pages).
Brochure by Melroe—"Spra-Coupe—3000 Series" (2 pages).
Brochure by Melroe—"Spra-Coupe—Options & Accessories" (3 pages).
Brochure by Melroe—"Spra-Coupe—2300 Series" (4 pages).
Brochure by John Deere—"6500 Self-Propelled Sprayer" (18 pages).
Brochure by Hagie—"284 Sprayer" (4 pages).
Brochure by Setter Manufacturing Division—"Setter's Swather Conversion High Clearance Sprayer" (3 pages).
Brochure by MacDon Industries Ltd.—"Premier 2900" (4 pages).

*Primary Examiner*—Andres Kashnikow
*Assistant Examiner*—Jorge S. Bocanegra
*Attorney, Agent, or Firm*—Adrian D. Battison; Murray E. Thrift

[57] ABSTRACT

A sprayer attachment is designed for mounting upon a swather tractor and includes a central frame with a tank which can be carried upon the front arms of the swather tractor. Two masts each carry a respective one of a pair of booms, each for extending outwardly to a respective side of the tractor for movement with the tractor in a spraying action. Each boom includes an inner section, an outer section and a tip portion. In the folding action the outer section and tip portion are folded about a horizontal axis so as to move to a position overlying the inner section. The folded boom is then pivoted about a vertical axis at the mast to lie along side the side of the tractor. The tip portion includes a parallel cable in advance of the tip portion for impacting an obstacle with the cable actuating release of the latch and accelerating the tip portion away from the obstacle to prevent impact with the obstacle. The tip portion is also moved to the retracted position during the folding action so that the maximum height of the outer section during folding is reduced to avoid contact with power lines and the like.

25 Claims, 10 Drawing Sheets

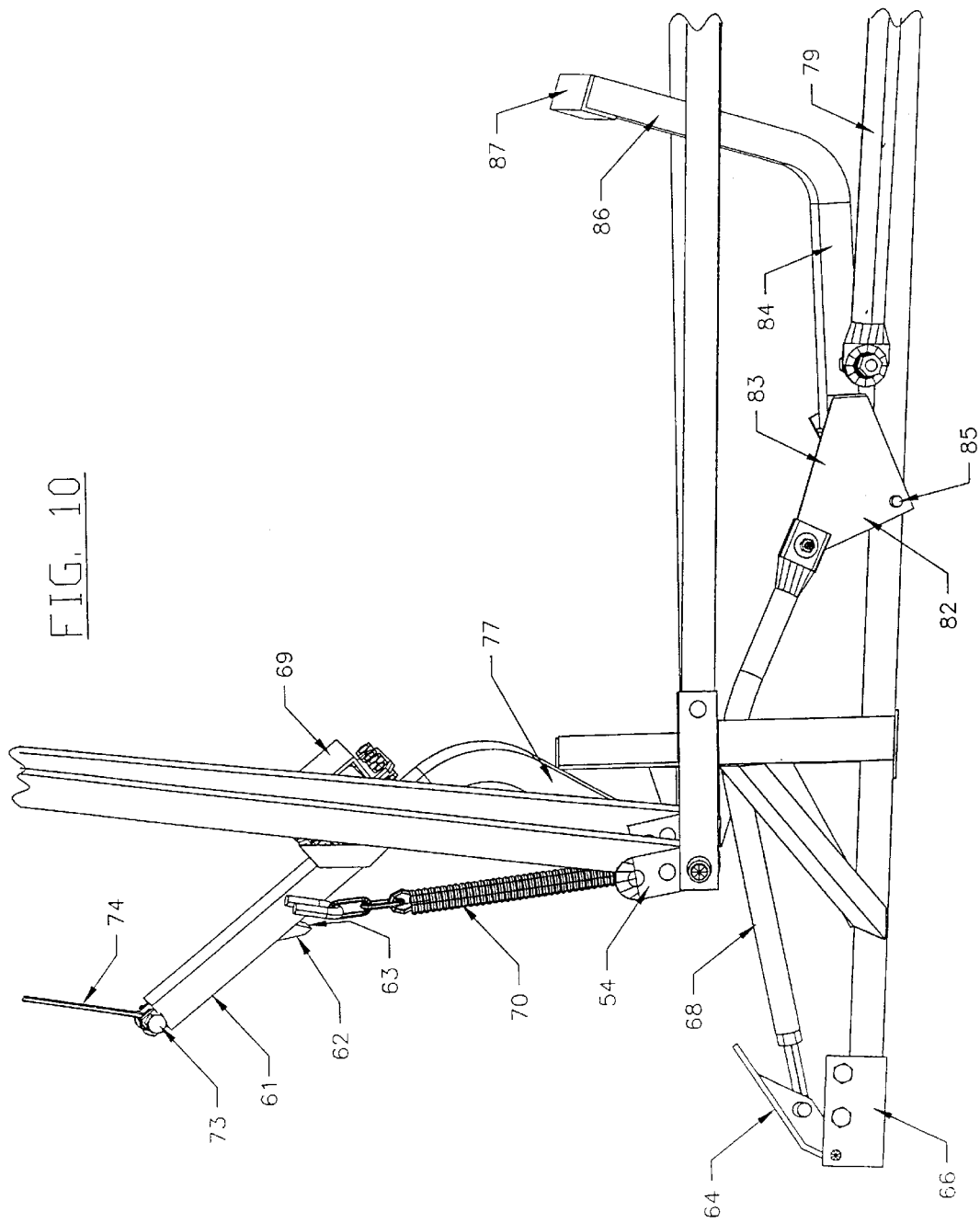

AGRICULTURAL BOOM WITH A RETRACTABLE TIP PORTION

BACKGROUND OF THE INVENTION

The invention relates to a boom for use in spreading a fluid material by mounting the boom on an agricultural tractor vehicle for transportation across the ground, the boom including a tip portion which can be retracted or folded rearwardly relative to the collinear extent of the boom.

The present invention is presently concerned with a boom for a sprayer that could also be used in other distribution systems for example for distributing particulate or granular materials in an air stream.

Many different designs of booms have previously been proposed for devices of this type. Many booms include a tip portion which can retract or move rearwardly if impacted by an obstacle in order to reduce the possibility of damage of the boom should the operator make a mistake and the impact of the boom, particularly adjacent its tip, on an adjacent obstacle. It will of course be appreciated that the operator needs to maneuver the vehicle so that the tip portion moves as close as possible to the obstacle so that the spraying action occurs also in the area of the obstacle but this in some case leads to the possibility of error, particularly if the boom is of a longer length for example greater than 70 feet from the tip of one boom to the tip of the opposed boom on the opposite side of the tractor vehicle.

Most break-away tips of this type are pivoted about an axis which is inclined to the vertical so that gravity tends to redirect the tip portion back into its collinear working position. However springs can also be used alone or in addition to gravity to effect the return. In most cases the tip portion includes a friction latching arrangement which simply holds the tip portion in place by friction rather than a positive locking action since this can be readily released by the impact. Examples of a break-away tip portion of this type are shown in a brochure by Tyler showing the "Patriot" Applicator;

However this arrangement is generally unsatisfactory in that normal vibration can cause release so that the operator tends to overtighten the clamp to prevent inadvertent release until the clamp is so tight that it is not released by impact.

It is known from brochures by Flexicoil showing the "65 Field Sprayer" and Knight showing the KM100 Field Sprayer to provide an impact tube in advance of the break-away tip so that the impact tube absorbs the impact from the obstacle and causes release of the break-away or retraction movement. In the Flexicoil arrangement, the whole of the boom breaks away and folds rearwardly. However this is used with a relatively slow moving tow-behind arrangement and provides no energy absorption of the impact energy on the boom.

A further concern for long booms of this type is that of folding the boom for movement to a transport position retracted against the sides of the tractor.

Some folding systems simply pivot the boom about an axis adjacent the tractor so that it folds inwardly to lie along side the tractor. Examples of booms of this type are shown in the Knight brochure and in a brochure by Melroe showing the "Spray Coupe". A brochure by John Deere showing the 6500 self propelled sprayer provides a vertical folding action to form a complex "X" arrangement of the boom in the folded position.

Another example of a folding action is shown in the brochure of Hagie showing the 284 sprayer in which the boom has an inner portion and an outer portion with the outer portion pivotally mounted at an end of the inner portion for folding action in which the outer portion pivots upwardly and inwardly about a generally horizontal axis to fold to a position on top of the inner portion, following which the two folded portions are pivoted about a vertical axis to fold along side the tractor.

The present invention is particularly but not exclusively designed for use as a conversion system for mounting a sprayer kit including a tank and booms on a conventional swather tractor. A previous example of this type of arrangement has been manufactured and sold by Setter Manufacturing Division and shown in a brochure entitled "Setter's Swather Conversion High Clearance Sprayer" in which a tank and boom are provided as a separate assembly for mounting on the forwardly extending supporting arms of the conventional swather tractor.

A swather tractor of this type is manufactured by the present assignees MacDon and is shown in a brochure entitled "Premier 2900".

The present invention is particularly but not exclusively concerned with longer booms of the order of 90 feet in which the danger of impact with an obstacle is more serious and in which the folding action is more problematic in that, even if folded as inner and outer boom portions, the length of each portion can be as much as 20 feet so that the portions are themselves unwieldy and dangerous.

SUMMARY OF THE INVENTION

It is one object of the present invention to provide an improved boom for an agricultural tractor with an improved construction of a break-away tip.

According to the invention, therefore, there is provided a boom for mounting on a tractor for use in spreading a fluid material across the ground as the tractor transports the boom across the ground, the boom comprising:

a main generally horizontal boom section having an inner end mounted on the tractor and an outer end spaced outwardly from the tractor to one side thereof;

a break-away tip portion mounted on the outer end of the main boom section;

the tip portion having an inner end pivotally mounted on the outer end of the main section for pivotal movement about an axis which is generally upright, such that the tip portion, on impacting an obstacle, pivots about the axis from a working position collinear with the main section to a retracted position inclined rearwardly from the main section;

an actuating cable mounted so as to extend generally parallel to the tip portion forwardly of the tip portion for impacting an obstacle in advance of the tip portion;

and means mounting the cable on the tip portion, the mounting means being arranged such that impact with an obstacle causes a deflection of the cable toward the tip portion and said deflection causes transmission of force to the tip portion in a direction to accelerate the tip portion in pivotal movement about said axis away from the obstacle.

Preferably the boom includes a latch for holding the tip portion in the working position and wherein the cable is arranged such that said deflection of the cable releases the latch allowing the tip portion to move to the retracted position.

Preferably one end of the cable is attached to a cushion arm pivotally mounted on the tip portion, the cushion arm being moveable against spring resistance by said deflection of the cable.

Preferably the cushion arm is mounted on the tip portion by a torsion coupling arranged to absorb energy from the pivotal movement of the cushion arm.

Preferably the cushion arm includes a stop portion arranged such that pivotal movement of the tip portion to the retracted portion causes impact of the stop portion of the cushion arm with an abutment and wherein engagement of the stop portion with the abutment causes distortion of the torsion coupling so as to release energy from the movement of the tip portion.

Preferably the cushion arm is arranged such that movement of the cushion arm causes release of the latch.

Preferably the latch includes a latch jaw and an abutment member and wherein the abutment member of the latch is mounted directly on the cushion arm such that movement of the cushion arm releases the abutment member from latching engagement with the latch jaw of the latch.

According to a second aspect of the invention there is provided a boom for mounting on a tractor for use in spreading a fluid material across the ground as the tractor transports the boom across the ground, the boom comprising:

a main generally horizontal boom section having an inner end mounted on the tractor and an outer end spaced outwardly from the tractor to one side thereof;

a break-away tip portion mounted on the outer end of the main boom section;

the tip portion having an inner end pivotally mounted on the outer end of the main section for pivotal movement about an axis which is generally upright, such that the tip portion, on impacting an obstacle, pivots about the axis from a working position collinear with the main section to a retracted position inclined rearwardly from the main section;

the main body section including an inner boom portion and an outer boom portion, the outer boom portion being mounted at an outer end of the inner boom portion;

the inner boom portion being mounted on the tractor for folding movement between an extended working position and a folded retracted position;

the outer boom portion being mounted on the inner boom portion for folding movement relative to the inner boom portion about a folding axis which is transverse to the boom and which is generally horizontal through an angle of the order of 180° between an extended position in which the outer portion is collinear with the inner portion and a folded position in which the outer portion overlies the inner portion;

and means for actuating movement of the tip portion to the retracted position for at least part of the folding movement of the outer boom portion, for reducing a maximum height of an outer end of the tip portion during said folding movement.

Preferably the boom includes fold actuating means for actuating said folding movement of the outer portion and wherein said actuating means for actuating movement of the tip portion is actuated by movement of said fold actuating means.

Preferably the boom includes a latch for holding the tip portion in the working position wherein the latch is opened in response to said fold actuating means.

Preferably the boom includes first pushing means for pushing the tip portion from the working position toward the retracted position, the first pushing means being actuated in response to said fold actuating means.

Preferably the first pushing means comprises a latch jaw of a latch for holding the tip in the working position.

Preferably the boom includes second pushing means for pushing the tip portion from the retracted position toward the working position, the second pushing means being actuated in response to said fold actuating means.

BRIEF DESCRIPTION OF THE DRAWINGS

FIG. 8A is an isometric view of the pivot mounting of the tip portion on an enlarged scale.

FIG. 10 is the same top plan view as that of FIG. 7 showing the tip portion in the retracted position after an impact with an obstacle.

In the drawings like characters of reference indicate corresponding parts in the different figures.

DETAILED DESCRIPTION

Figure 1:
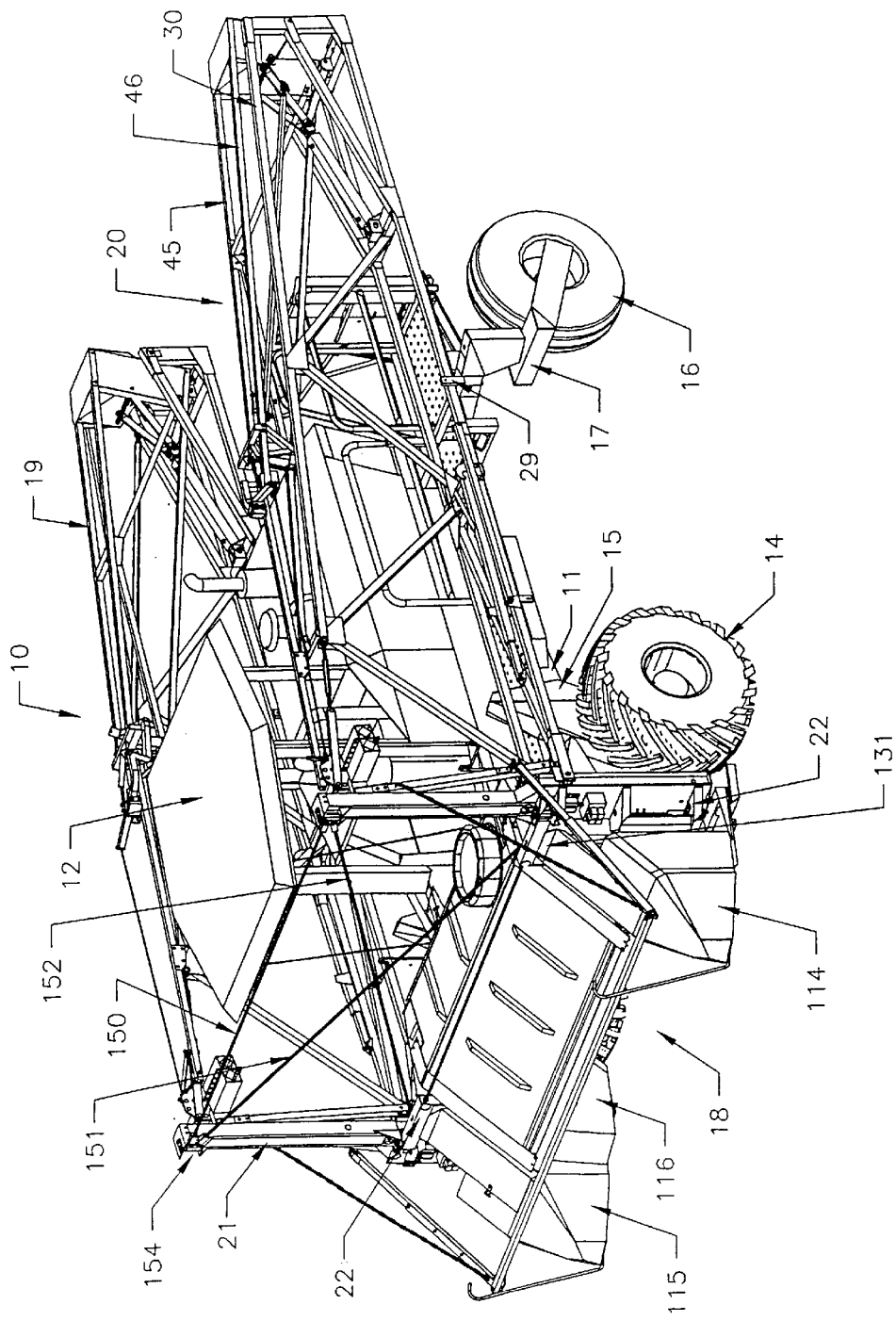
FIG. 1 is an isometric view showing a tractor and boom arrangement therefore in a first folded position of the boom.
Figure 2:
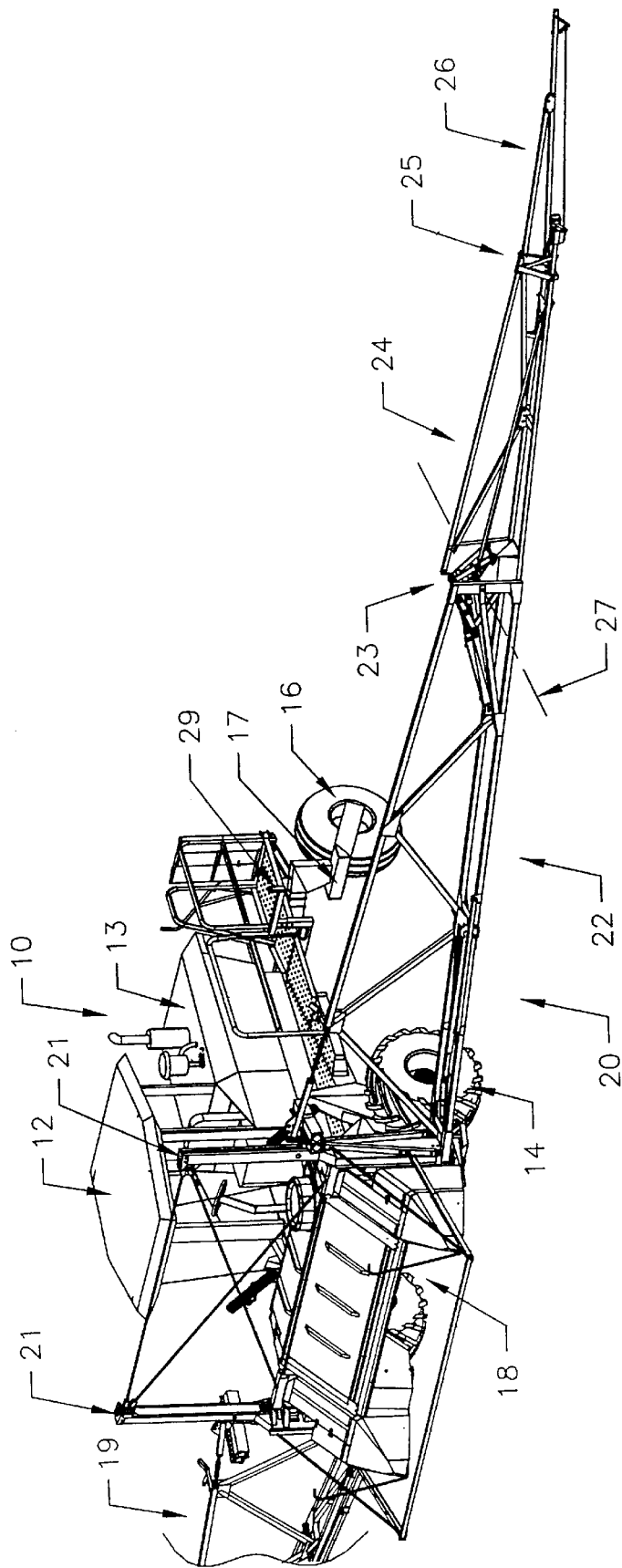
FIG. 2 is a similar isometric view on a smaller scale showing the booms in an extended position.

The tractor shown in FIGS. 1 and 2 is generally indicated at 10 and comprises a frame 11 supporting a cab 12 and an engine section 13. At the front of the frame is mounted a pair of front ground wheels 14 which are the type mounted on a support 15 which provide vertical suspension only by a relatively large pneumatic tires. The ground wheels 14 are driven by hydraulic motors so that steering of the tractor can be controlled by varying the speed of forward movement of one or other of the ground wheels 14. The rear ground wheels 16 are each mounted on a caster assembly 17 which allows free rotation about a vertical axis.

A type of tractor shown in FIGS. 1 and 2 is of the type used as a swather tractor and the tractor carries at the forward end (not shown) a pair of support arms for carrying a header for use in cutting a standing crop. The tractor therefore has a wide stance for conventionally allowing the formation of the swath between the ground wheels. Swather tractors of this type are widely known and are conventionally used only for carrying a header so that the arrangement of the present invention provides a conversion system for use of the conventional swather tractor in transporting a sprayer tank and booms for spreading or spraying fluid material over the ground.

An example of a tractor of this type is manufactured by the assignees of the present application which is MacDon Industries Ltd. A swather tractor of this type is generally designed for transporting a header and therefore has particular characteristics which indicate particular parameters for the sprayer boom assembly to be mounted on the swather tractor. In particular the swather tractor is relatively slow in view of the fact that its suspension is provided solely by the resilience of the pneumatic tires. Secondly the tires are relatively wide so that both of these characteristics indicate that the sprayer boom assembly should have as wide a width as possible so as to minimize the number of passes of the tractor across the ground and to maximize the amount of area covered in a single pass.

The sprayer assembly to mount on the tractor comprises a tank and frame section generally indicated at 18 which are not particularly described herein as they are described in more detail in a co-pending application filed simultaneously herewith.

The present application is particularly concerned with the construction of the booms and thus the following description relates particularly to this area and describes in detail the construction of each of the booms.

Thus on the tank and frame section 18 is mounted a pair of booms 19 and 20. Each boom is mounted upon a respective one of a pair of masts 21 carried at a respective side of the tank and frame section 18. Each mast 21 is mounted for rotation about a vertical axis on a pivot support assembly 22 carried on the section 18. Thus each mast can rotate between the field position shown in FIG. 2 and the transport position shown in FIG. 1. This rotation thus requires movement through substantially 90° so that the booms move from the outward position shown in FIG. 2 to the folded position along side the side of the tractor as shown in FIG. 1.

Each boom comprises an inner section 22 extending from the mast 21 to a central joint 23, an outer section 24 extending from the joint 23 to a second joint 25 and a tip portion 26. In general, in the position shown in FIG. 2, the three sections defined by the inner section 22, the outer section 24 and the tip portion 26 are arranged collinear and extending outwardly to the side of the tractor. In the position shown in FIG. 1, the outer section 24 and the tip portion 26 are folded inwardly about a horizontal axis 27 so the tip portion is moved inwardly to a position lying on top of an inner end of the inner section and particularly upon a cradle 59. Thus in effect the boom is folded in half with the inner section and the outer part of the boom defined by the outer section 24 and the tip portion 26 being arranged to intermesh. The folded boom is then moved inwardly to the position shown in FIG. 1 and supported upon a cradle 29 carried on the side of the tractor rearwardly of the mast 21.

The boom can also move vertically along the mast from a lowered spraying position shown in FIG. 2 to a raised position. The height of the boom can therefore be varied for spraying at different heights depending upon the crop condition. The transport position is achieved while the boom is in the raised height as shown in FIG. 1.

Figure 3:
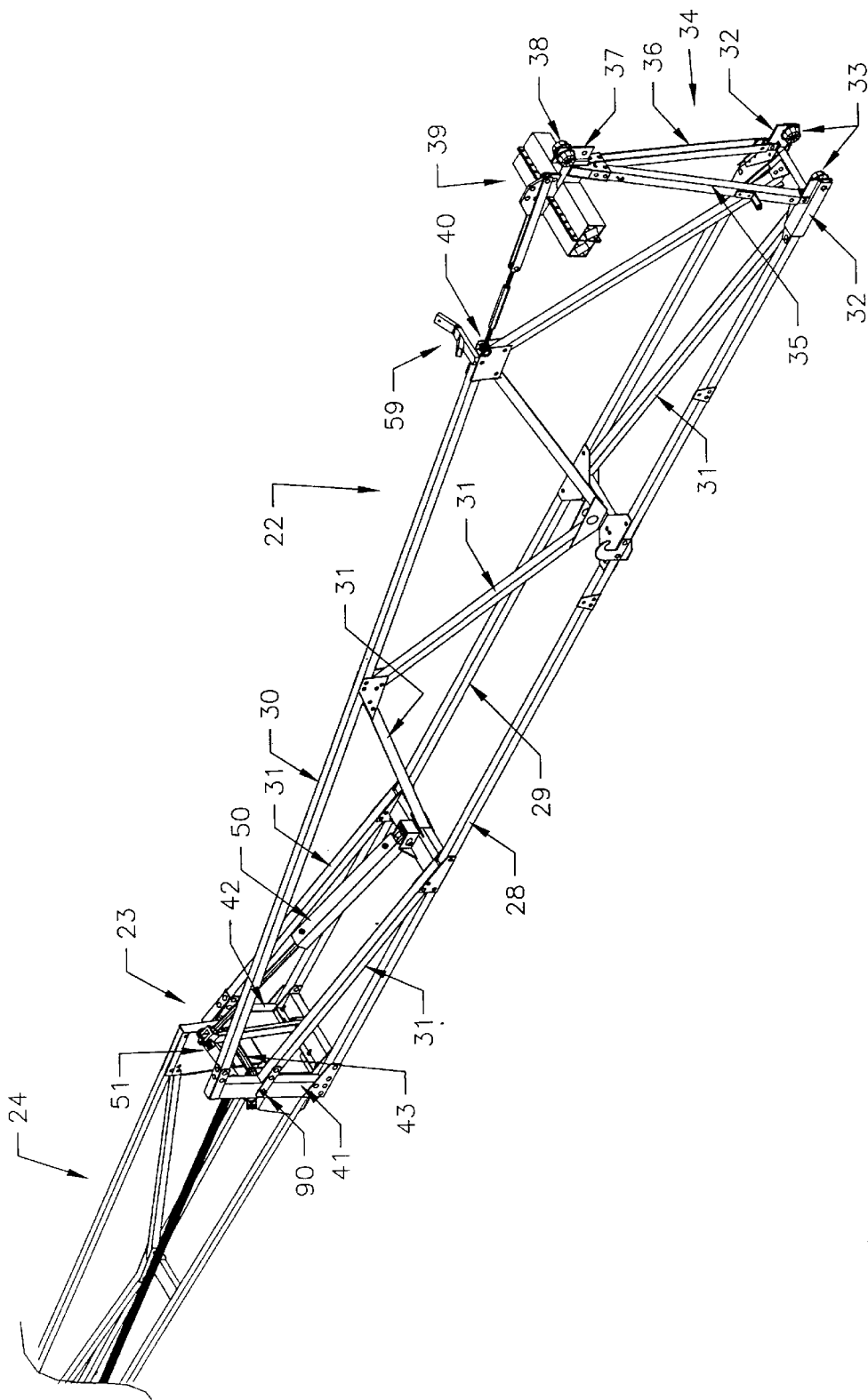
FIG. 3 is an isometric view on an enlarged scale on an inner part of one of the booms and the junction between the inner and outer parts.
Figure 4:
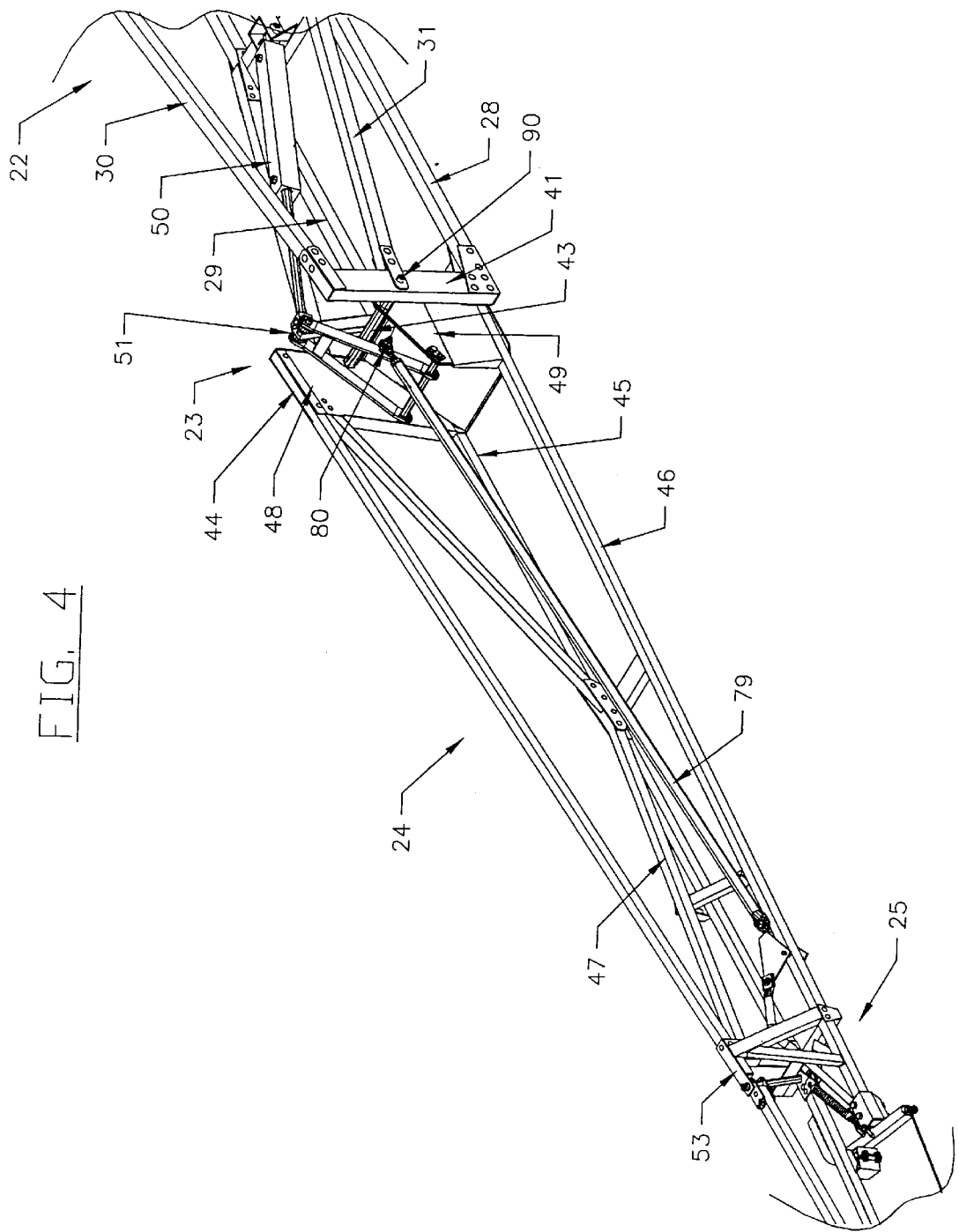
FIG. 4 is an isometric view on the same scale as FIG. 3 showing an outer part of the boom of FIG. 3 and the junction between the inner and outer parts.
Figure 5:
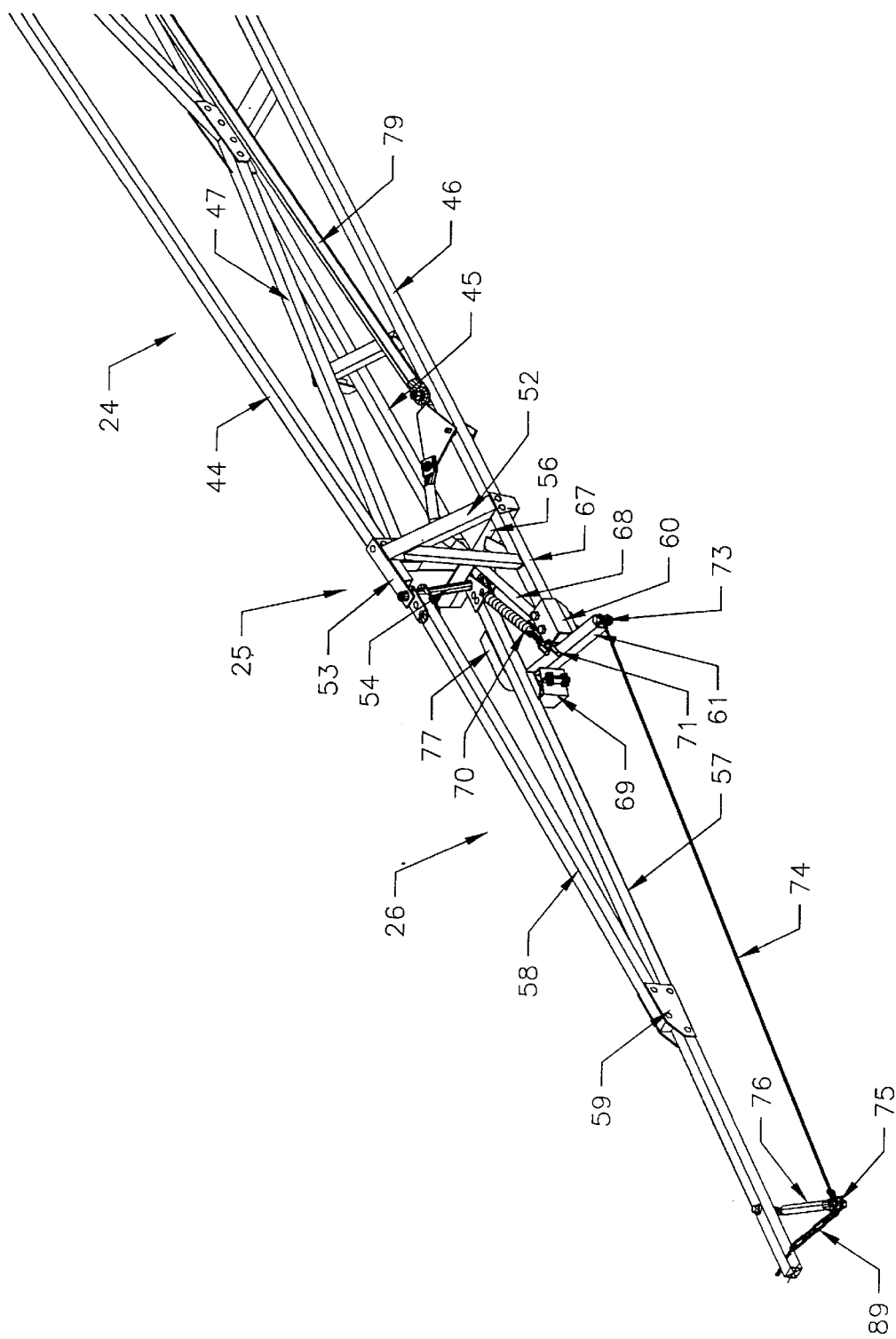
FIG. 5 is an isometric view on the same scale as FIG. 3 showing the outer end of the outer part of the boom and a break-away tip portion mounted on the outer end.

The construction of the boom is shown in more detail in FIGS. 3, 4, and 5. Each of the inner, outer and tip sections is formed generally as a triangular truss using square tubing. Thus the inner section 22 comprises a pair of bottom rails 28 and 29 which are parallel and lie in a common horizontal plane together with a top rail 30 which is located generally between the bottom rail and to the height above the bottom rails. The rails are interconnected by a series of diagonal braces 31 which are arranged in accordance with good engineering practice to provide the required structural strength for the truss.

At the inner end of each of the bottom rails 28 and 29 is provided a mounting bracket 32 for attachment to the mast 21 of the main frame. The mounting bracket 32 provides a pair of inwardly projecting flanges each carrying a roller 33 for vertical rolling movement in a respective one of a pair of channels on the mast. On top of the flanges of the mounting brackets is provided a standard 34 defined by two braces 35 and 36 each of which is pivotally mounted at the lower end to a respective one of the brackets 32 for pivotal movement about a horizontal axis transverse to the bottom rails. The braces 35 and 36 converge to an upper bracket 37 at which is mounted a pair of rollers 38 each arranged on a respective side of a vertical flange of the bracket. The mast includes a further pair of upper guide channels for receiving the rollers 38 with the upper channels of the mast being arranged face-to-face so as to receive the rollers there between.

Thus the whole of the boom can move upwardly and downwardly along the vertical extent of the mast with the upper rollers moving in an upper half of the mast and the lower rollers moving in a lower half of the mast with the mast being approximately twice the height of the standard 34.

Between the bracket 37 and the top rail 30 is provided a suspension spring arrangement 39 which allows extension and retraction of a coupling member joining the bracket 37 to the inner end of the top rail 30 as indicated at 40. The spring thus allows upward and downward pivoting movement of the boom relative to the mast. The spring is arranged to provide energy absorption so as to effect a dampening action on the suspension of the boom.

The top rail 30 commences at a position substantially mid-way between the two bottom rails 28 and 29 so that the triangle defined by the standard 34 is approximately an isosceles triangle. However the rail extends then from the central position at each upper end to a position vertically above the bottom rail 28 where it is attached to a vertical post 41 at the joint 23.

The joint 23 further includes a second post 42 mounted at the outer end of the bottom rail 29 and standing upwardly therefrom. The posts 41 and 42 are braced by two of the braces 31 which extend to a position at the top of the post 42 and a position part way up the post 41. At the top of the braces 31 is provides a pivot tube 43 which contains a shaft 90 which defines a pivot for the joint and mounts the inner end of the outer section 24.

The outer section 24 is similar to construction that it includes two bottom rails 45 and 46 and a top rail 44. The rails are formed into a truss section by interconnecting braces 47. At the inner end of the outer section is provided a pair of posts 48 and 49 each mounted above a respective one of the bottom rails 45 and 46. The top rail 44 at its inner end is connected to the post 48 and extends outwardly therefrom to an outer end located mid-way between the bottom rails 45 and 46. The pivot rod 43 pivotally passes through the posts 48 and 49 so as to allow the posts 48 and 49 to rotate about the pivot shaft 43 in a pivotal action.

The inner end of the rails 45 and 46 and the posts 48 and 49 are located inside the outer end of the rails 28 and 29 and the respective posts 41 and 42. The height of the posts is arranged so that the outer portion 24 can fold inwardly about the axis of the pivot shaft 43 from the collinear position shown in FIGS. 2, 3, and 5, through the partly folded position shown in FIG. 8 to the folded position shown in FIG. 1. In the folded position, the bottom rails 45 and 46 lie along side the top rail 30. Also in the folded position 44 lies adjacent the bottom rails 28 and 29.

The pivotal movement is effected by a cylinder 50 acting upon a four bar linkage arrangement 51 which is of a conventional construction and actuates a pulling movement on the outer section which is communicated through the posts 48 and 49. The construction of the linkage 51 is well known to one skilled in the art and therefore will not be described in detail.

Turning now to the junction 25 between the outer portion 24 and the tip portion 26 as shown best in FIGS. 4 and 5, this comprises a triangular standard 52 defined by upwardly and inwardly inclined braces connecting between the bottom rails 45 and 46 and an apex at the top rail 44. At the apex of the standard 52 is provided a support bracket 53 which extends outwardly beyond the end of the top rail 44 and defines a top support for a bearing tube 54 containing a pivot shaft. A bottom support bracket for the shaft 54 is provided as a plate 55 on the bottom rail 45. The plate 55 is arranged at a transverse beam 56 of the triangular standard 52 while the bracket 53 extends outwardly of that position thus supporting the bearing tube 54 at an angle of the order of 15° from a vertical plane transverse to the length of the boom. The bearing tube 54 also stands in a vertical plane longitudinal of the boom and defined by one vertical leg of the triangular standard 52.

The tip portion 26 comprises a main horizontal rail 57 and an inclined upper rail 58. The rails thus have their inner ends connected to the bearing tube 54 at opposite ends of the pivot shaft while the rails converge to an apex 59 part way along the horizontal rail 57.

The boom therefore defines a substantially collinear bottom rail which can be used to support a series of material distribution nozzles at space positions along the length of the boom for distribution of a fluid material from the supply tank across the area of the ground covered by the forward movement of the boom.

Figure 6:
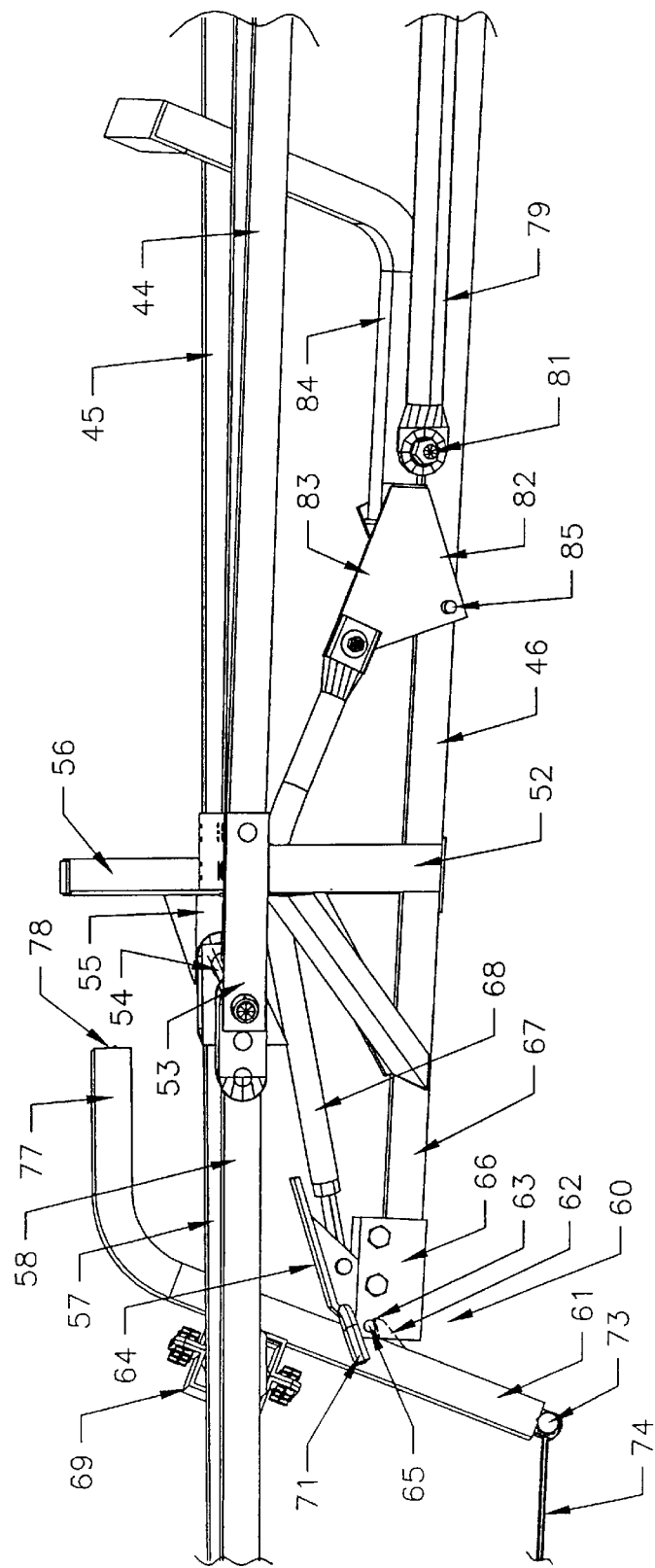
FIG. 6 is a top plan view on an enlarged scale showing the joint between the outer end of the outer section and the tip portion in the collinear position.
Figure 7:
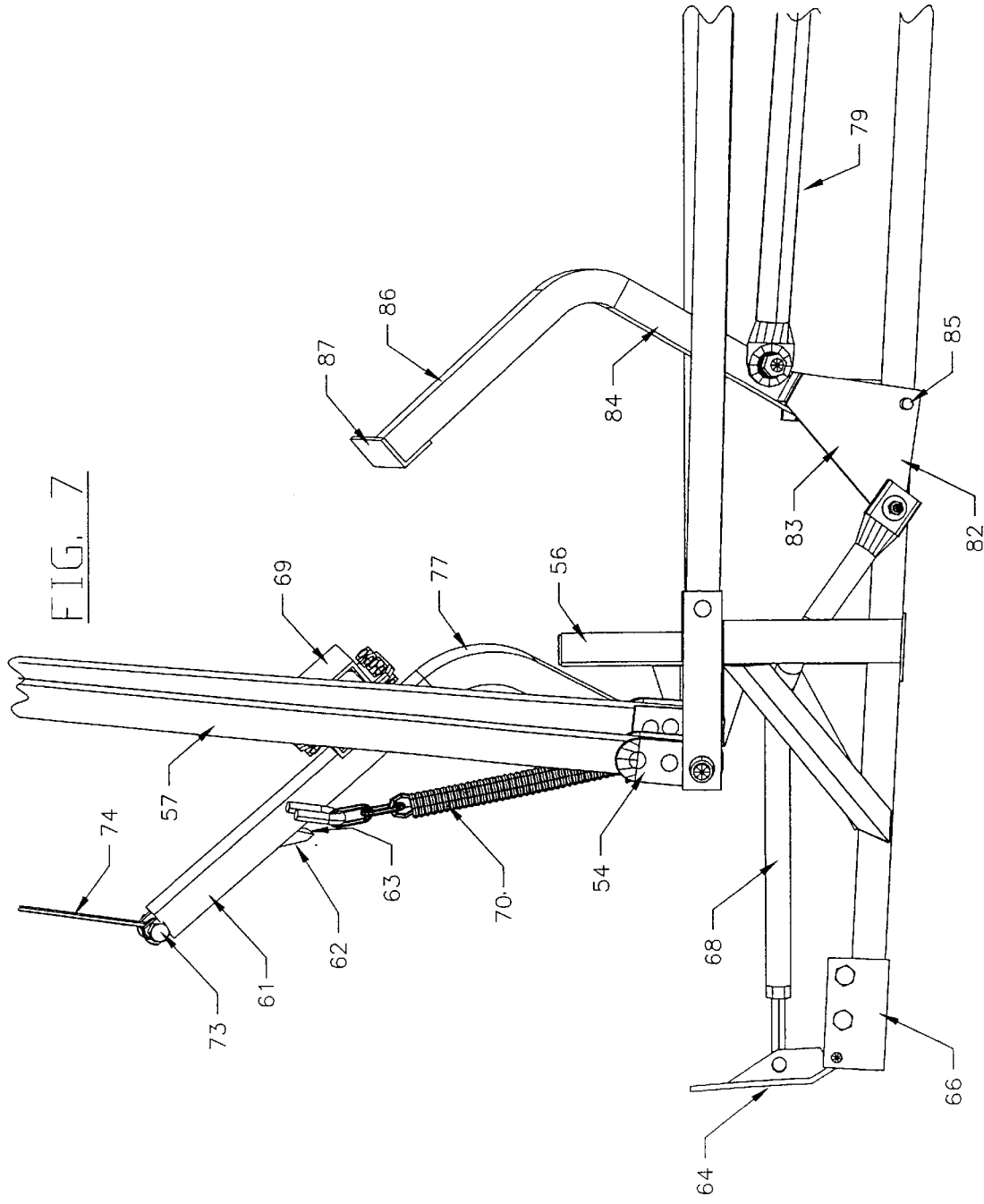
FIG. 7 is the same top plan view as that of FIG. 6 showing the tip portion in the retracted position during a folding action.
Figure 8:
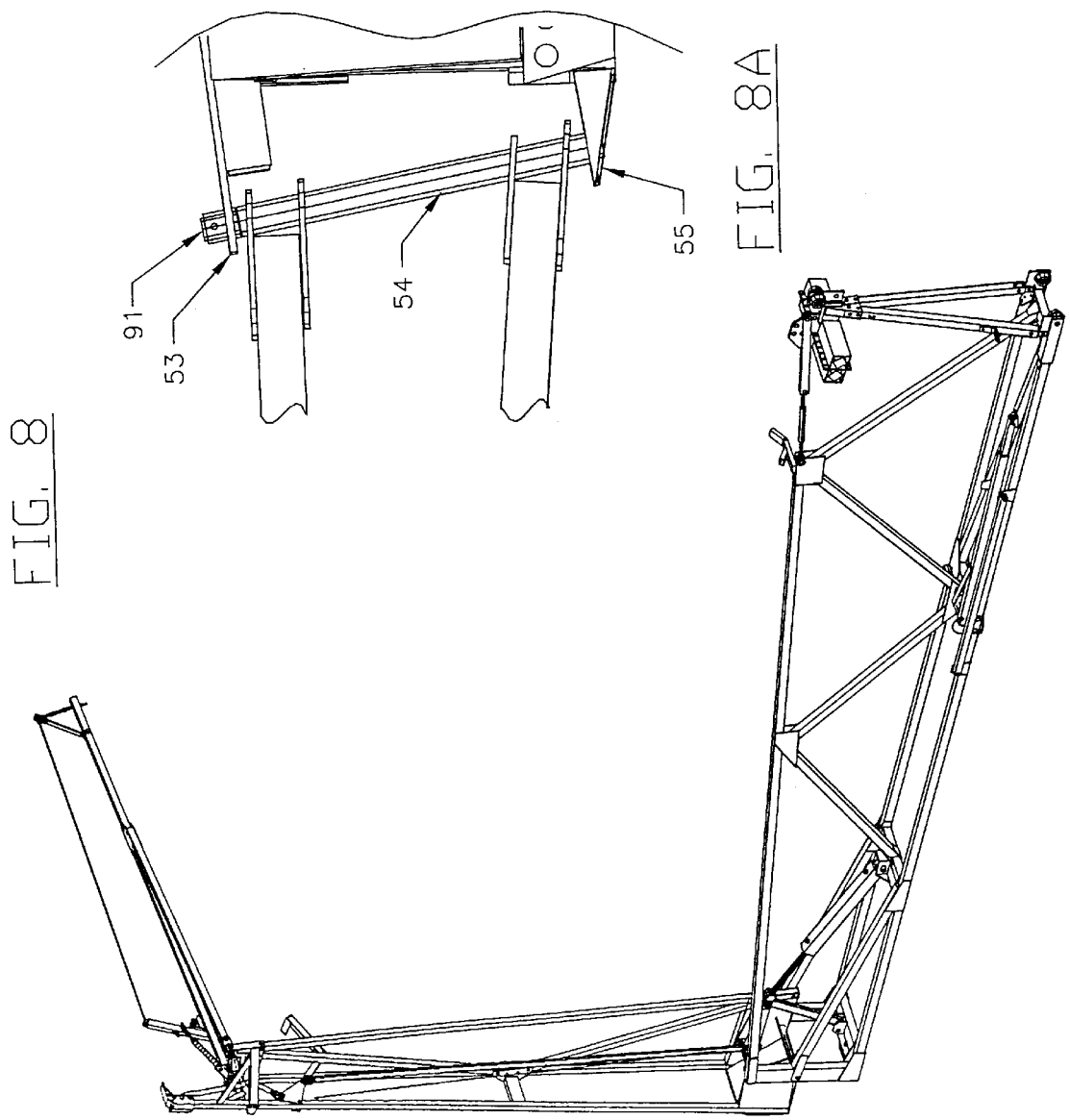
FIG. 8 is an isometric view similar to that of FIG. 3 showing the boom in a part folded position.

The tip portion 26 can thus pivot about the pivot shaft 54 from the collinear position shown in FIGS. 5 and 6 to a retracted position shown in FIGS. 7 and 8. This pivotal movement can be effected in response to impact with an obstacle while the tip portion is in the working position or can be effected as part of the folding action. In view of the inclination of the bearing tube 54, the center of gravity of the tip portion rises as the tip portion pivots rearwardly from the collinear position so that it tends to fall back to the collinear position under gravity.

The tip portion is latched in the collinear position by a latch generally indicated at 60. The latch 60 includes a latch cushion arm 61 which carries a latch abutment 62 having an angled front face 63 for engaging against a latch jaw 64. The latch jaw is pivotally mounted upon a shaft 65 carried on a support block 66 at the end of an extension portion 67 of the bottom rail 46. The latch jaw 64 is normally held fixed in place by a control arm 68 so that the latch jaw is normally stationed during operation of the boom in the working position.

The cushion arm 61 is pivotally mounted on the bottom rail 57 by a spring pivot mounting 69 which allows the cushion arm to rotate about a vertical axis at right angles to the rail 57 while allowing some side-to-side flexing movement.

The cushion arm is biased into a latching position by a coil spring 70 mounted upon a hook 71 on the cushion arm and attached at the other end to the plate 55. For convenience of illustration, the spring 70 is omitted from FIG. 6.

The cushion arm is also biased to the latching position by the spring action of the spring pivot 69.

The cushion arm 61 extends forwardly from the latch block 66 to a forward end which carries a coupling 73 for a cable 74. The cable extends from the coupling 73 to a similar coupling 75 at a forward end of a support arm 76 which is held at a fixed angle relative to the rail 57 by a chain 77. Thus the cable 74 lies in a common horizontal plane with the rails 57 and is located forwardly of and parallel to the rail 57 so as to impact any obstacle prior to the tip portion as the tip portion and the boom move forwardly across the ground.

Figure 9:
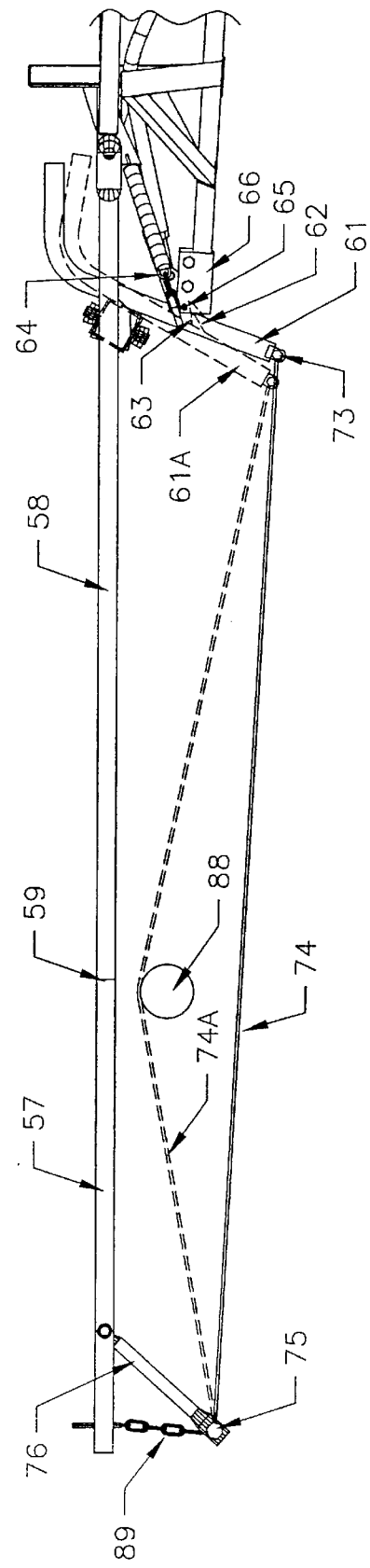
FIG. 9 is a top plan view of the tip portion showing the impact of the tip portion with an obstacle.

In operation of the tip portion during normal working action of the boom, as best shown in FIG. 9, an obstacle 88 impacts the cable 74 at a point along its length thus pulling the cable 74 rearwardly to take up an angle position as indicated at 74A. This deflection of the cable applies a pulling action on the cushion arm 61 so as to move the cushion arm 61 to a retracted position indicated at 61A. This pulls the latch abutment 62 and its inclined surface 63 away from the latch jaw 64 thus unlatching the tip portion from the latch block 66 and allowing the tip portion to pivot rearwardly about the pivot shaft 54. Forces are applied to the tip portion in the rearward pivoting direction by the distortion of the cable so the cable tends to provide a pulling action away from the obstacle and also by the forces in the spring coupling 69 which tends to resist the movement of the cushion arm 61.

These forces are arranged so they are sufficient generally to prevent the obstacle reaching the tip portion itself before the tip portion is rapidly accelerated rearwardly away from the obstacle. It will be appreciated that impact of the cable 74 of the tip portion with an obstacle can be effected at a higher speed than the normal forward speed of the vehicle since the operator will tend to steer away from an obstacle when realizing that the boom is too close thus accelerating the outer end of the boom. In this way a nominal forward speed of 10 to 15 miles per hour can lead to an impact speed of greater than 20 miles per hour. For this reason the cable arrangement prevents any impact of the tip portion itself with the obstacle thus absorbing the impact forces within the springs of the system rather than on the tip portion itself.

At the same time the positive latching arrangement which normally holds the tip portion against rearward retracting movement provided by the engagement between the latch abutment 62 and the jaw 64 prevents the tip portion from moving unstably as the boom swings during steering movements or acceleration of the vehicle.

The cushion arm 61 also includes a trailing end portion 77 which projects to the opposite side of the rail 57 and then turns in a direction generally parallel to the rail 57 behind the rail 57. This portion 77 acts as a stop to limit and to restrict the rearward retracting movement of the tip portion. It can be appreciated that the tip portion when impacted as described previously will accelerate rapidly in the rearward retracting direction and it is necessary therefore to absorb the energy of the retracting movement to prevent damage to the elements of the system. This energy absorption is effected by impacting of the end 78 of the portion 77 with the rearward projecting extension of the cross beam 56. This impact causes severe distortion of the spring coupling 69 and causes further extension of the spring 70 so that the energy is absorbed into the spring elements and the movement of the tip portion halted without damage.

Once the obstacle is cleared, the cushion arm is pulled back to its working position by the spring 70 and by the spring resilience in the coupling 69 and the tip portion is pulled back to its working position by gravity so both parts return to the working position for continued working operation.

The latch 64 can also be operated by movement of the latch control arm 68. The latch control arm is moved generally longitudinally of the boom by a push rod 79 connected to the linkage 51. Thus actuation of the cylinder 50 gradually pushes an inward end 80 of the arm 79 on the linkage 51 outwardly as the linkage is actuated to pivot the outer section 24 to the folded position. An outer 81 of the push rod 79 is mounted upon a pivot member 82 in the form of a triangular plate 83 which is attached to an arm 84. The triangular plate 83 is mounted for pivotal movement about a rod 85.

The arm 84 includes a cranked section 86 with an abutment end 87 for engaging the bottom rail of the tip portion when the tip portion is in the retracted position shown in FIG. 7 and the arm is moved forwardly for returning the tip portion to the extended position.

In operation as best seen in FIGS. 6, 7, and 8, actuation of the folding mechanism defined by the cylinder 50 and the linkage 51 causes a pushing movement on the push rod 79 and therefore on the latch control arm 68. The linkage is arranged so that the movement of the latch jaw 64 only commences after the outer section 24 has been raised by an angle of the order of 15°. At this time the pushing action pushes the latch jaw 64 forwardly so that it releases from the surface 63 and pushes the cushion arm 61 with the pushing force acting longitudinally of the boom thus tending to pivot the tip portion about its pivot shaft 54. Thus the pushing action starts the tip portion in pivotal movement around the pivot shaft 54 from the latch position from which it has been released, rearwardly toward the retracted position. This movement is continued by the action of gravity so that the tip portion gradually tilts rearwardly to the retracted position as the outer section 24 gradually rises in the folding action.

In the position shown in FIG. 7, therefore, the latch jaw 64 has been moved to its outermost position and the tip portion has pivoted around to the retracted position generally at right angles to the center section until the cushion arm 61 of the tip portion engages the end portion 56 of the beam 52.

The retracted position is thus achieved at an angle of approximately 45° of the movement of the outer section 24 and the retracted position is maintained until the outer section reaches an angle of movement of the order of 135°. During this time, therefore, the tip portion lies at right angles to the outer section thus reducing the maximum height of the boom as it is folded by the length of the tip portion. In an example where the boom is 90 feet in length so that the outer section including the tip portion is approximately 20 feet in length, the retraction of the tip portion ensures that the maximum height of the boom as it falls does not exceed 20 feet, which is generally sufficient to ensure that it does not contact electrical power lines.

When the folding action of the outer section reaches the position at approximately 135° of movement, the continued pushing action on the push rod 79 pushes the triangular plate 83 over center relative to the pivot 85 so that control arm 68 is then retracted back along the boom away from the block 66 to again pull the latch jaw 64 back to its original latching position. At the same time the arm 84 and the abutment 87 are pushed forwardly, causing the tip portion to be pushed around the pivot shaft 54 back toward to the collinear position. This pushing action causes the tip portion to pivot outwardly again to take up the collinear position in which it is latched by engagement of the latch abutment 62 with the latch jaw 64.

In the collinear position, the folding action to the fully folded position is continued until the tip portion rests upon the cradle 56 with the cushion arm absorbing the motion and avoiding the necessity of accurate adjustment.

After completing the inward folding action of the boom, the mast 21 is then pivoted as previously described to move the whole boom to the folded position shown in FIG. 1.

It will be appreciated that the particular arrangement of the folding linkage and the actuation system which then actuates the movement of the tip portion as shown and described herein is only exemplary and alternative arrangements for obtaining these movements can be designed and used. In addition the latch arrangement can also be modified.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A boom for mounting on a tractor for use in spreading a fluid material across the ground as the tractor transports the boom across the ground, the boom comprising:

a generally horizontal main boom section having an inner end mounted on the tractor and an outer end and being movable from a deployed position in which the outer end extends outwardly to one side of the tractor to a folded position in which the outer end is retracted toward the tractor;

a break-away tip portion mounted on the outer end of the main boom section for movement therewith from the deployed position to the folded position;

the tip portion having an inner end pivotally mounted on the outer end of the main section for pivotal movement about an axis which is generally upright, such that the tip portion is pivotal about the axis from a working position collinear with the main section to a retracted position inclined rearwardly from the main section;

a protection cable mounted on the tip portion so as to extend generally parallel to the tip portion forwardly of the tip portion for impacting an obstacle in advance of the tip portion;

and means connecting the cable to the tip portion, the connecting means being arranged such that:

impact with an obstacle causes a deflection of the cable toward the tip portions;

the connecting means absorbs energy from the impact;

the connecting means causes transmission of force to the tip portion in a direction to accelerate the tip portion in pivotal movement relative to the main boom section about said axis away from the obstacle;

the amount of energy absorbed and the force transmitted are sufficient to accelerate the tip portion away from the obstacle at a rate to prevent impact of the obstacle on the tip portion.

2. The boom according to claim 1 including a latch for holding the tip portion in the working position and wherein the cable is arranged such that said deflection of the cable releases the latch allowing the tip portion to move to the retracted position.

3. The boom according to claim 1 wherein the main body section includes an inner boom portion and an outer boom portion, the outer boom portion being mounted at an outer end of the inner boom portion;

the inner boom portion being mounted on the tractor for folding movement between an extended working position and a folded retracted position;

the outer boom portion being mounted on the inner boom portion for folding movement relative to the inner boom portion about a folding axis which is transverse to the boom and which is generally horizontal through an angle of the order of 180° between an extended position in which the outer portion is collinear with the inner portion and a folded position in which the outer portion overlies the inner portion;

and wherein there is provided means for actuating movement of the tip portion to the retracted position for at least part of the folding movement of the outer boom portion, for reducing a maximum height of an outer end of the tip portion during said folding movement.

4. The boom according to claim 3 including fold actuating means for actuating said folding movement of the outer portion and wherein said actuating means for actuating movement of the tip portion is actuated by movement of said fold actuating means.

5. The boom according to claim 3 including a latch for holding the tip portion in the working position wherein the latch is opened in response to said fold actuating means.

6. The boom according to claim 3 including first pushing means for pushing the tip portion from the working position toward the retracted position, the first pushing means being actuated in response to said fold actuating means.

7. The boom according to claim 6 wherein the first pushing means comprises a latch jaw of a latch for holding the tip in the working position.

8. The boom according to claim 3 including second pushing means for pushing the tip portion from the retracted position toward the working position, the second pushing means being actuated in response to said fold actuating means.

9. A boom for mounting on a tractor for use in spreading a fluid material across the ground as the tractor transports the boom across the ground, the boom comprising:

a main generally horizontal boom section having an inner end mounted on the tractor and an outer end spaced outwardly from the tractor to one side thereof;

a break-away tip portion mounted on the outer end of the main boom section;

the tip portion having an inner end pivotally mounted on the outer end of the main section for pivotal movement about an axis which is generally upright, such that the tip portion, on impacting an obstacle, pivots about the axis from a working position collinear with the main section to a retracted position inclined rearwardly from the main section;

the main body section including an inner boom portion and an outer boom portion, the outer boom portion being mounted at an outer end of the inner boom portion;

the inner boom portion being mounted on the tractor for folding movement between an extended working position and a folded retracted position;

the outer boom portion being mounted on the inner boom portion for folding movement relative to the inner boom portion about a folding axis which is transverse to the boom and which is generally horizontal through an angle of the order of 180° between an extended position in which the outer portion is collinear with the inner portion and a folded position in which the outer portion overlies the inner portion;

and means for actuating movement of the tip portion to the retracted position for at least part of the folding movement of the outer boom portion, for reducing a maximum height of an outer end of the tip portion during said folding movement.

10. The boom according to claim 9 including fold actuating means for actuating said folding movement of the outer portion and wherein said actuating means for actuating movement of the tip portion is actuated by movement of said fold actuating means.

11. The boom according to claim 9 including a latch for holding the tip portion in the working position wherein the latch is opened in response to said fold actuating means.

12. The boom according to claim 9 including first pushing means for pushing the tip portion from the working position toward the retracted position, the first pushing means being actuated in response to said fold actuating means.

13. The boom according to claim 12 wherein the first pushing means comprises a latch jaw of a latch for holding the tip in the working position.

14. The boom according to claim 9 including second pushing means for pushing the tip portion from the retracted position toward the working position, the second pushing means being actuated in response to said fold actuating means.

15. A boom for mounting on a tractor for use in spreading a fluid material across the ground as the tractor transports the boom across the ground, the boom comprising:

a generally horizontal main boom section having an inner end mounted on the tractor and an outer end and being movable from a deployed position in which the outer end extends outwardly to one side of the tractor to a folded position in which the outer end is retracted toward the tractor;

a break-away tip portion mounted on the outer end of the main boom section for movement therewith from the deployed position to the folded position;

the tip portion having an inner end pivotally mounted on the outer end of the main section for pivotal movement about a tip pivot axis which is generally upright, such that the tip portion is pivotal about the tip pivot axis from a working position collinear with the main section to a retracted position inclined rearwardly from the main section;

a protection cable mounted on the tip portion so as to extend generally parallel to the tip portion forwardly of the tip portion for impacting an obstacle in advance of the tip portion and arranged such that impact with an obstacle causes a deflection of the cable toward the tip portion;

a cushion arm connected to the cable;

a spring coupling connected to the cushion arm so as to absorb energy from the impact;

the cushion arm and the spring coupling being arranged so as to cause transmission of force from the impact through the cushion arm to the tip portion in a direction to accelerate the tip portion in pivotal movement relative to the main boom section about said axis rearwardly away from the obstacle.

16. The boom according to claim 15 wherein the cushion arm comprises a lever attached to the tip portion and extending forwardly therefrom such distortion of the cable pulls a forward end of the lever to apply a force to tip portion in a direction to move rearwardly around the tip pivot axis.

17. The boom according to claim 16 wherein the cushion arm is connected to the tip portion by the spring coupling such that movement of the cushion arm from the cable causes energy to be absorbed by the spring coupling and causes the energy to be transmitted to the tip portion.

18. The boom according to claim 17 wherein the cushion arm includes a stop portion arranged such that pivotal movement of the tip portion to the retracted position causes impact of the stop portion of the cushion arm with an abutment and wherein engagement of the stop portion with the abutment causes distortion of the spring coupling so as to release energy from the movement of the tip portion.

19. The boom according to claim 15 including a latch for holding the tip portion in the deployed position and wherein the cushion arm is arranged such that movement of the cushion arm causes release of the latch.

20. The boom according to claim 19 wherein the latch includes a latch jaw and an abutment member and wherein the abutment member of the latch is mounted directly on the cushion arm such that movement of the cushion arm releases the abutment member from latching engagement with the latch jaw of the latch.

21. A boom for mounting on a tractor for use in spreading a fluid material across the ground as the tractor transports the boom across the ground, the boom comprising:

a generally horizontal main boom section having an inner end mounted on the tractor and an outer end and being movable from a deployed position in which the outer end extends outwardly to one side of the tractor to a folded position in which the outer end is retracted toward the tractor;

a break-away tip portion mounted on the outer end of the main boom section for movement therewith from the deployed position to the folded position;

the tip portion having an inner end pivotally mounted on the outer end of the main section for pivotal movement about a tip pivot axis which is generally upright, such that the tip portion is pivotal about the tip pivot axis from a working position collinear with the main section to a retracted position inclined rearwardly from the main section;

a protection cable mounted on the tip portion so as to extend generally parallel to the tip portion forwardly of the tip portion for impacting an obstacle in advance of the tip portion and arranged such that impact with an obstacle causes a deflection of the cable toward the tip portion;

a cushion arm connected to the cable which comprises a lever attached to the tip portion and extending forwardly therefrom such that distortion of the cable pulls a forward end of the lever to apply a force to the tip portion in a direction to move rearwardly around the tip pivot axis.

22. The boom according to claim 21 wherein the cushion arm is connected to the tip portion by a spring coupling such that movement of the cushion arm from the cable causes energy to be absorbed by the spring coupling and causes the energy to be transmitted to the tip portion to move rearwardly.

23. The boom according to claim 22 wherein the cushion arm includes a stop portion arranged such that pivotal movement of the tip portion to the retracted position causes impact of the stop portion of the cushion arm with an abutment and wherein engagement of the stop portion with the abutment causes distortion of the spring coupling so as to release energy from the movement of the tip portion.

24. The boom according to claim 21 including a latch for holding the tip portion in the deployed position and wherein the cushion arm is arranged such that movement of the cushion arm causes release of the latch.

25. The boom according to claim 21 wherein the latch includes a latch jaw and an abutment member and wherein the abutment member of the latch is mounted directly on the cushion arm such that movement of the cushion arm releases the abutment member from latching engagement with the latch jaw of the latch.

* * * * *